United States Patent
Kondapi et al.

(10) Patent No.: US 11,150,966 B1
(45) Date of Patent: Oct. 19, 2021

(54) MANAGING TOAST NOTIFICATIONS VIA A TOAST ADAPTER AND PLUGINS

(71) Applicant: Dell Products L.P., Round Rock, TX (US)

(72) Inventors: Srikanth Kondapi, Austin, TX (US); Alexander Kucheravy, Austin, TX (US); Ian Chang, Daan Dist (TW); Chih-Ming Chen, New Taipei (TW); Ping-Cheng Hsieh, New Taipei (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/016,569

(22) Filed: Sep. 10, 2020

(51) Int. Cl.
*G06F 3/00* (2006.01)
*G06F 9/54* (2006.01)
*G06F 9/445* (2018.01)

(52) U.S. Cl.
CPC .......... *G06F 9/542* (2013.01); *G06F 9/44526* (2013.01); *G06F 9/541* (2013.01)

(58) Field of Classification Search
CPC .............................. G06F 9/542; G06F 9/44526
USPC ......................................................... 719/318
See application file for complete search history.

(56) References Cited

U.S. PATENT DOCUMENTS

| | | | | |
|---|---|---|---|---|
| 2005/0223375 A1* | 10/2005 | Duggan | ................ | G06F 9/445 717/173 |
| 2009/0287772 A1* | 11/2009 | Stone | ................ | H04L 67/28 709/203 |
| 2009/0313244 A1* | 12/2009 | Sokolenko | ................ | G06F 16/951 |
| 2010/0162131 A1* | 6/2010 | Gaillard | ................ | H04M 1/00 715/751 |
| 2015/0256686 A1* | 9/2015 | Young | ................ | H04N 1/00477 358/1.15 |
| 2018/0205715 A1* | 7/2018 | Ingale | ................ | H04L 67/26 |

OTHER PUBLICATIONS

Uri Dekel, A Plug-In Based Framework for Research on Interruption Management in Distributed Software Development. (Year: 2004).*

Anuja H. Vaidya, Comprehensive Study and Technical Overview of Application Development in iOS, Android and Window Phone 8. (Year: 2013).*

* cited by examiner

*Primary Examiner* — Lechi Truong
(74) *Attorney, Agent, or Firm* — Kirton McConkie; Brian Tucker (57) ABSTRACT

Toast notifications can be managed via a toast adapter and plugins. A toast adapter can function as an intermediary between a service and an application that interfaces with the Windows toast framework. The service can employ plugins that are configured to send toast requests to the toast adapter. The toast requests can include metadata from which the toast adapter can construct toast content. The toast adapter can then interface with the application to submit the toast content to the Windows toast framework to cause the toast notifications to be displayed. When a user interacts with a toast notification, the arguments that the Windows toast framework provides can be relayed by the application to the toast adapter. The toast adapter may then identify which plugin was the source of the toast notification and provide an indication of the user's interaction with the toast notification to the plugin.

18 Claims, 8 Drawing Sheets

MANAGING TOAST NOTIFICATIONS VIA A TOAST ADAPTER AND PLUGINS

CROSS-REFERENCE TO RELATED APPLICATIONS

N/A

BACKGROUND

The present invention generally relates to Windows toast notifications. A toast notification is a message that an application can cause the Windows operating system to display to the user while the user is not currently using the application. Windows typically displays toast notifications for a short amount of time in the bottom right corner of the desktop on PCs and also makes them available in the Action Center until they are accessed by the user, cleared by the application or expire.

Figure 1:
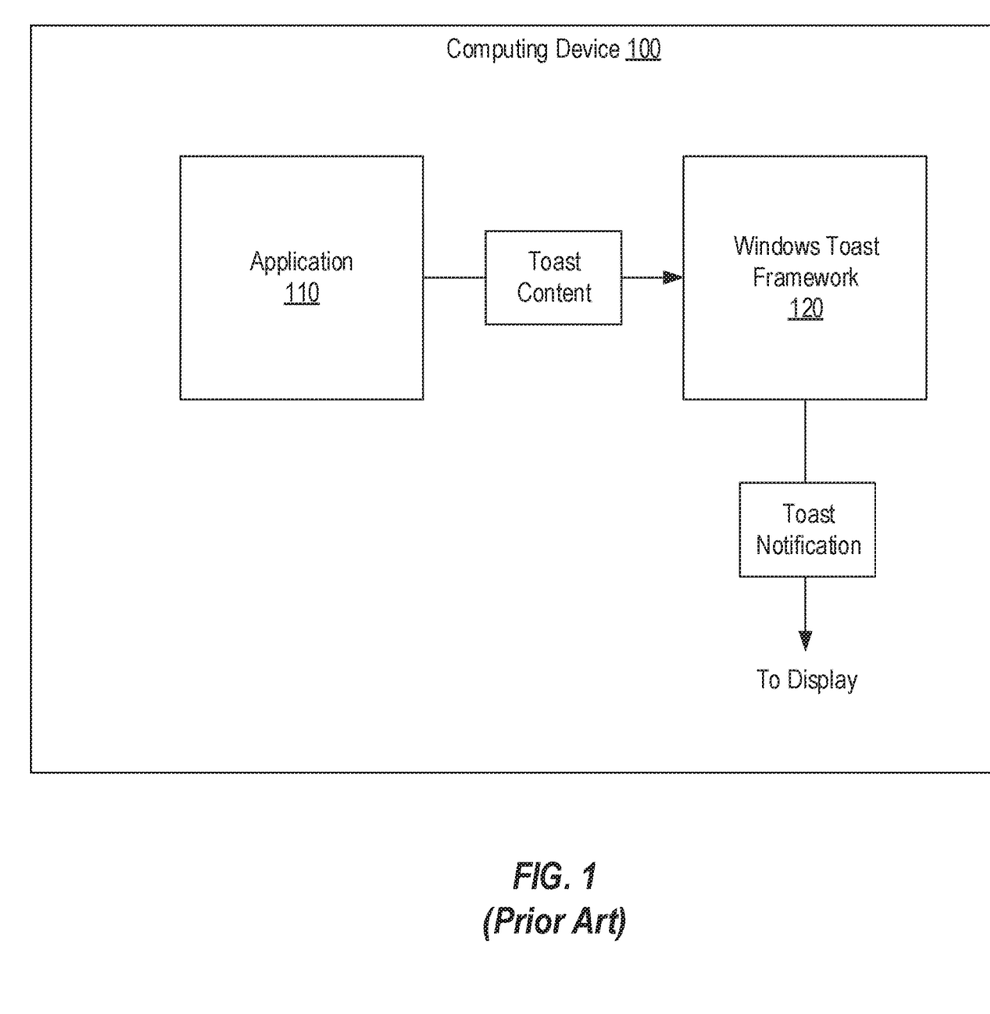
FIG. 1 provides an example of how an application can cause a toast notification to be displayed on a computing device running a version of the Windows operating system.

FIG. 1 provides an overview of how Windows allows an application to generate toast notifications. In FIG. 1, a computing device 100 is shown as including an application 110 and the Windows toast framework 120. In accordance with the current configuration of Windows, application 110 could be a desktop application or a Universal Windows Platform (UWP) application. Windows toast framework 120 is intended to represent the components of Windows that implement the toast functionality (e.g., the toast APIs).

As represented, application 110 can cause a toast notification to be displayed to the user when the user is not using application 110 by providing "toast content" to the Windows toast framework 120. The Windows toast framework 120 requires the toast content to conform to an XML schema. Application 110 may either create the XML toast content directly or employ available libraries (e.g., the Microsoft-.Tookit.Uwp.Notifications NuGet package) to generate the XML toast content. Once it has created the toast content, application 110 may send the toast content using the available APIs (e.g., by calling the Show method of the ToastNotifier class). The Windows toast framework 120 will then employ the toast content to generate and display a toast notification.

Figure 2:
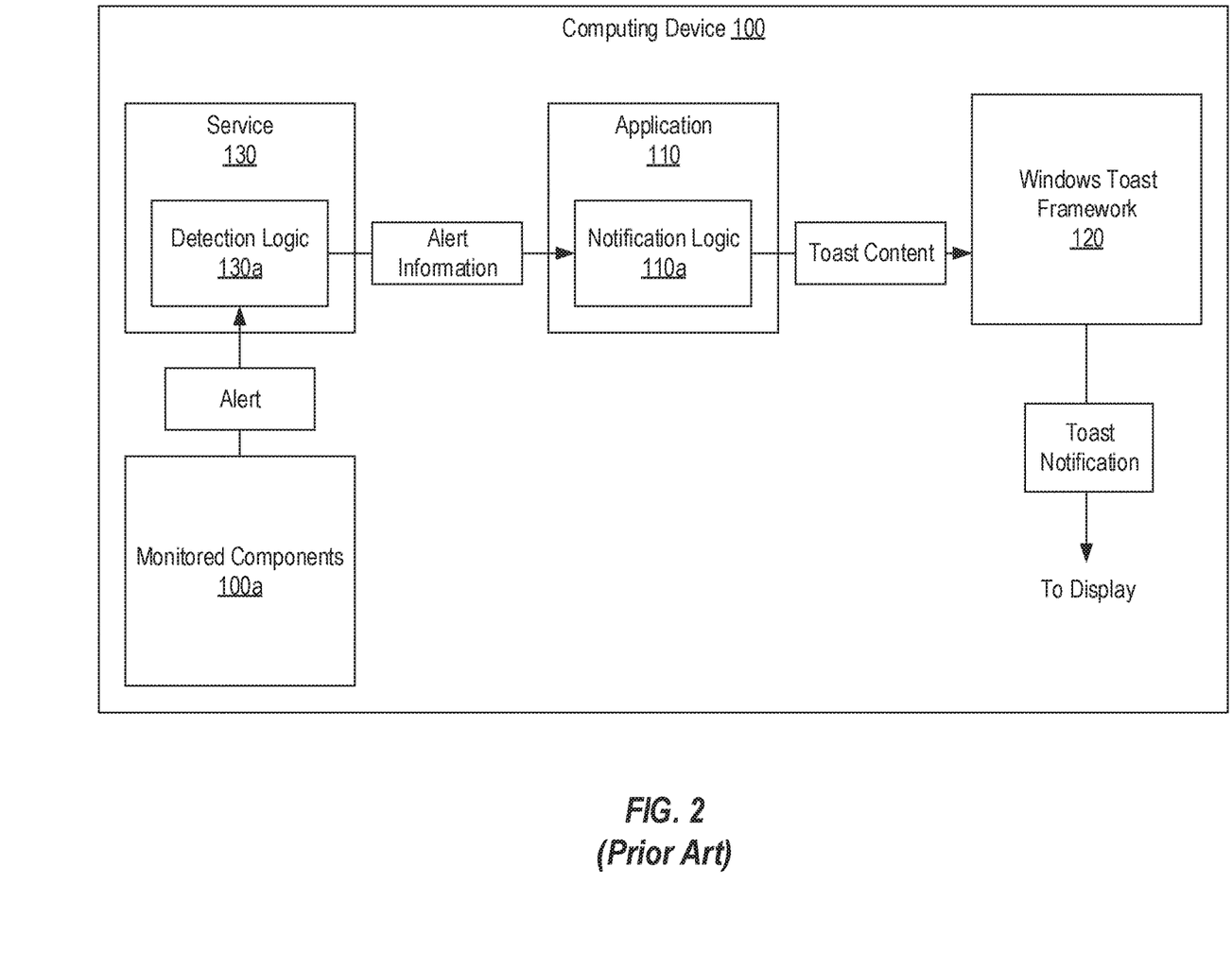
FIG. 2 provides an example of how a service can leverage an application to display toast notifications.

FIG. 2 illustrates one toast notification use case. FIG. 2 includes the same components as FIG. 1 but also shows a service 130 that is configured to receive/detect alerts (or events) from or related to various monitored components 100a. For example, service 130 could represent an optimizer tool that is configured to monitor hardware, BIOS, the operating system, other services or applications, etc. to determine if some action should be taken. For example, service 130 may include detection logic 130a that is configured to process the alerts relating to monitored components 100a to determine whether to notify the user of the alerts or to otherwise prompt the user to take some action (e.g., to plug in computing device 100, to install an update, etc.).

To leverage the Windows toast framework 120, detection logic 130a (or service 330) can be configured to provide alert information to application 110 which can employ its notification logic 110a to create properly formatted toast content from the alert information. In other words, detection logic 130a must be configured to provide alert information in the form expected by notification logic 110a so that notification logic 110a can convert the alert information into the form expected by the Windows toast framework 120. Although not shown, service 130 and application 110 will also need to be configured consistently to handle any arguments that the Windows toast framework 120 provides in response to the user's interaction with a toast notification (e.g., to parse and process the content of a ToastNotificationActivatedEventArgs object).

This model for providing toast notifications can add significant complexity and difficulty to the development and maintenance of application 110 and service 130. For example, if it is desired to generate a new toast notification in response to a new type of alert, it would typically be necessary to update detection logic 130a so that it is configured to compile the appropriate alert information for the new type of alert and provide it to notification logic 110a. It would also typically be necessary to update notification logic 110a so that it is configured to create appropriate toast content from the alert information for the new type of alert. Additional modifications to service 130 and application 110 may also be required to handle any arguments that the Windows toast framework 120 provides when the user interacts with the new type of toast notification. This complexity and difficulty can be further increased when multiple services are designed to employ application 110 to generate the same types of toast notifications. For example, whenever it is desired to generate a new or modified type of toast notification, it may be necessary to update application 110 and each service that will provide alert information to trigger the new or modified type of toast notification.

BRIEF SUMMARY

The present invention extends to methods, systems, and computer program products for managing toast notifications via a toast adapter and plugins. A toast adapter can be loaded on a computing device and can function as an intermediary between a service and an application that interfaces with the Windows toast framework. The service can employ one or more plugins that are configured to send toast requests to the toast adapter. The toast requests can include metadata from which the toast adapter can construct toast content. The toast adapter can then provide the toast content to the application which in turn can submit the toast content to the Windows toast framework to cause the toast notifications to be displayed.

When a user interacts with a toast notification, the application can receive the corresponding arguments from the Windows toast framework and relay the arguments to the toast adapter. The toast adapter may then identify which plugin was the source of the toast notification with which the user interacted and provide an indication of the user's interaction with the toast notification to the plugin. In this way, the service, which is the underlying source of the toast notification, and the application, which directly causes the Windows toast framework to display the toast notification, can be loosely coupled thereby simplifying the process of adding new toast notification functionality to the service or modifying the service's existing toast notification functionality.

In some embodiments, the present invention may be implemented as a method for managing toast notifications via a toast adapter and plugins. A toast adapter may receive a first toast request from a first plugin that is integrated into a first service. In response to the first toast request, the toast adapter may generate first toast content. The toast adapter may then provide the first toast content to an application to cause the application to submit the first toast content to the Windows toast framework to thereby cause a first toast notification to be displayed.

In some embodiments, the present invention may be implemented as computer storage media storing computer executable instructions which when executed on a computing device implement a method for managing toast notifications via a toast adapter and plugins. A toast adapter may receive toast requests from one or more plugins that are integrated into one or more services. In response to each toast request, the toast adapter may generate toast content. The toast adapter may provide the toast content generated for each toast request to an application to cause the application to submit the toast content generated for each toast request to the Windows toast framework to thereby cause a toast notification to be displayed in response to each toast request.

In some embodiments, the present invention may be implemented as a computing device that includes one or more processors and computer storage media storing computer executable instructions which when executed by the one or more processors implement a method for managing toast notifications via a toast adapter and plugins. In response to receiving toast requests from multiple plugins, a toast adapter may generate toast content for each of the toast requests. The toast adapter may cause the toast content for each of the toast requests to be submitted to a toast framework to thereby cause a toast notification for each of the toast requests to be displayed. In response to a user interacting with the toast notification that is displayed for a first toast request of the toast requests, the toast adapter may receive arguments representing how the user interacted with the toast notification. In response to receiving the arguments, the toast adapter may identify which of the multiple plugins sent the first toast request. The toast adapter may then send an indication of the user's interaction with the first toast notification to the identified plugin.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "computing device" should be construed as any computing device that includes a version of the Windows operating system that supports toast notifications. Therefore, a computing device may be a desktop, a laptop, a thin client, a server, a virtual machine, a smart phone, a tablet, etc. The "Windows toast framework" should be construed as encompassing the current mechanism and any future mechanism that the Windows operating system provides for enabling an application to cause a notification to be displayed when the user is not interacting with the application.

Figure 3A:
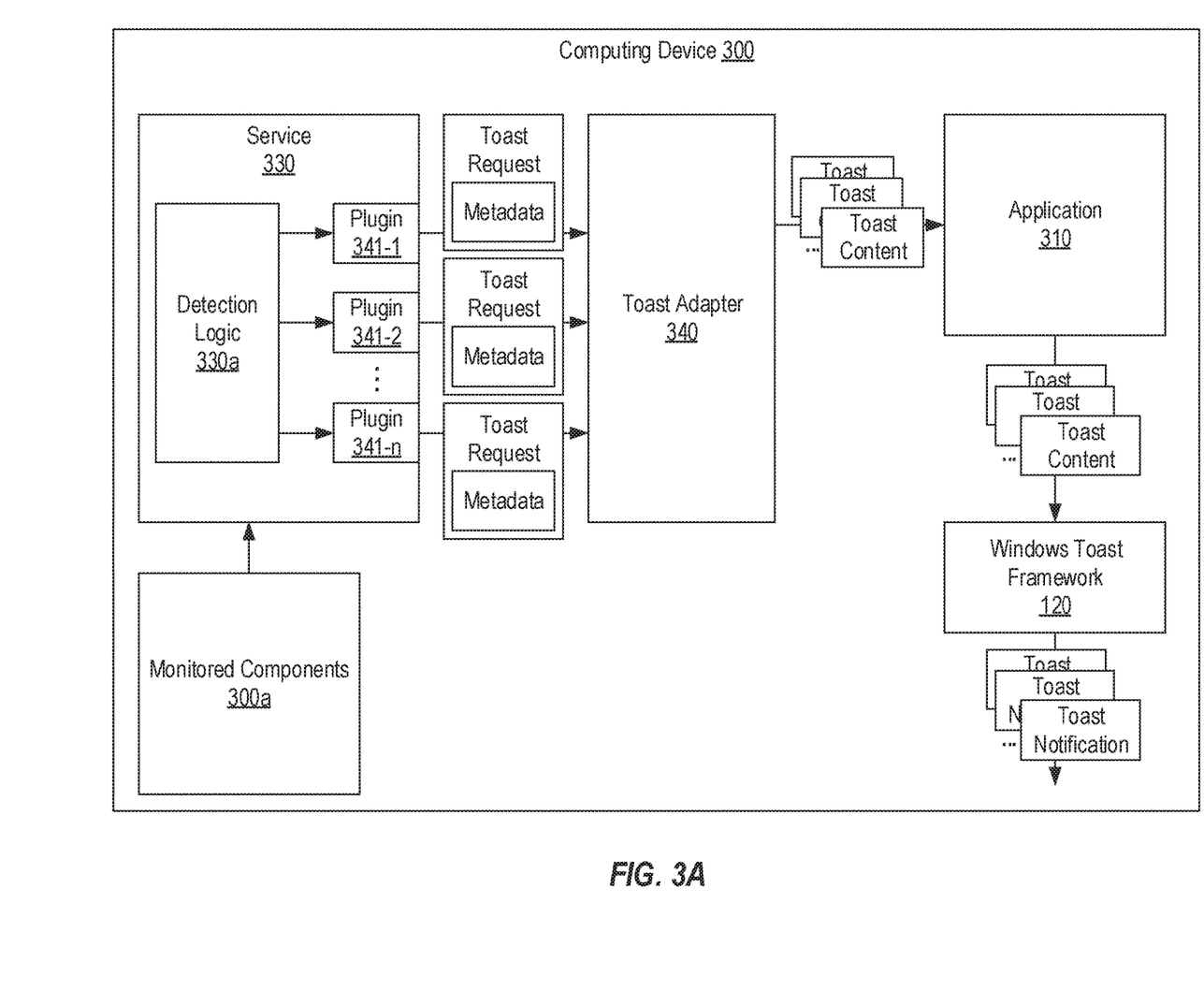
FIGS. 3A and 3B represent how a toast adapter and plugins can be employed on a computing device running a version of the Windows operating system to simplify the process of generating toast notifications from a service.
Figure 3B:
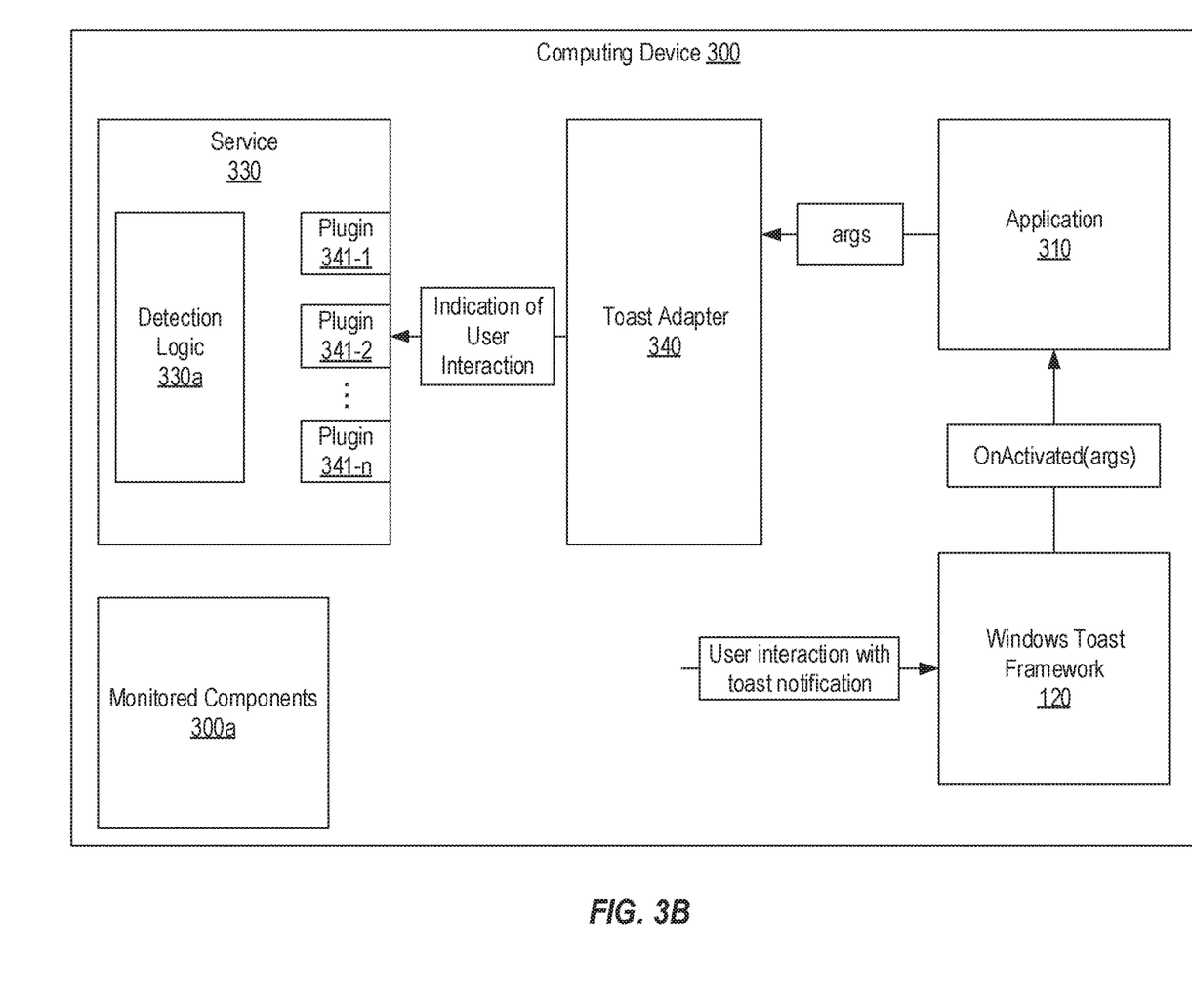

FIGS. 3A and 3B illustrate various components that may exist on a computing device 300 that is configured to implement embodiments of the present invention. Computing device 300 includes the Windows toast framework 120 which, as described in the background, can represent the components of Windows that implement the toast functionality. Computing device 300 also includes an application 310 that is configured to interface directly with the Windows toast framework 120. More particularly, application 310 can be configured to invoke the appropriate APIs of the Windows toast framework 120 (e.g., the Show method of the ToastNotifier class) to provide toast content to the Windows toast framework 120 to thereby cause the Windows toast framework 120 to display toast notifications. Application 310 can also be configured to process arguments that the Windows toast framework 120 may pass when the Windows toast framework 120 invokes application 310 in response to a user's interaction with a toast notification that application 310 generated. Application 310 could be a desktop application, a UWP application or any other type of application that can invoke the appropriate APIs to submit toast content to the Windows toast framework 120.

Computing device 300 also includes a service 330 that can generally be similar to service 130 described in the background. For example, service 330 can be configured to receive/detect alerts (or events) from or related to various monitored components 300a and employ detection logic 330a to determine, among possibly other things, if the user should be notified. It is noted, however, that this type of service is only one example of a service that may be employed in embodiments of the present invention. Embodiments of the present invention should not be limited to use with any particular type of service or by any functionality that a service may provide.

In accordance with embodiments of the present invention, computing device 300 may also include a toast adapter 340 that functions as an intermediary between service 330 and application 310 as well as one or more plugins (e.g., plugins 341-1 through 341-n) that service 330 can leverage to interface with toast adapter 340. In particular, plugins 341-1 through 341-n can be configured to submit toast requests to toast adapter 340. Although FIG. 3A depicts toast adapter 340 as being separate from service 330, in some embodiments, toast adapter 340 may be part of (i.e., run in the context of) service 330.

The term "toast requests" is intended to represent the communications sent by plugins to toast adapter 340 to request that toast adapter 340 cause a toast notification to be generated. The toast requests can include metadata from which toast adapter 340 can create toast content. The term "toast content" is intended to represent content in the form that the Windows toast framework 120 requires for causing a toast notification to be displayed. Accordingly, service 330 can invoke plugins 341-1 through 341-*n* to cause toast requests to be sent to toast adapter 340 without needing to know how toast adapter 340 expects the toast requests or the metadata they include to be structured. In simple terms, toast adapter 340 and plugins 341-1 through 341-*n* abstract the process of creating toast content from service 330 and application 310.

As represented in FIG. 3B, when the user interacts with a particular toast notification, the Windows toast framework 120 will invoke application 310 (e.g., by calling application 310's OnActivated method and passing an instance of the ToastNotificationActivatedEventArgs class which defines the arguments defining how the user interacted with the toast notification). Application 310 can retrieve the arguments and pass them to toast adapter 340. Toast adapter 340 can then employ the arguments to identify which plugin submitted the toast request which led to the particular toast notification being displayed. Toast adapter 340 can then provide an indication of the user's interaction with the toast notification (or "indication") to the identified plugin to enable the plugin/service to properly respond to the user's interaction. Accordingly, toast adapter 340 and plugins 341-1 through 341-*n* also abstract from service 330 and application 310 the process of responding to user interactions with toast notifications.

In some embodiments, each of plugins 341-1 through 341-*n* may be configured to generate toast requests for only a single type of toast notification. In other words, to generate a particular type of toast notification, service 330 may only need to integrate the plugin for that particular type of toast notification. In such embodiments, FIG. 3A may represent a scenario where service 330 is designed to generate multiple types of toast notifications and therefore multiple plugins have been integrated into service 330. However, a service may employ any number of the available plugins. In other embodiments, a plugin may be configured to generate toast requests for multiple types of toast notifications. For example, a plugin may be configured to generate toast requests for multiple types of related toast notifications. Notably, although not shown in FIG. 3A, multiple services on computing device 300 may integrate the same plugin or plugins for submitting the same type of toast requests to toast adapter 340.

Figure 4:
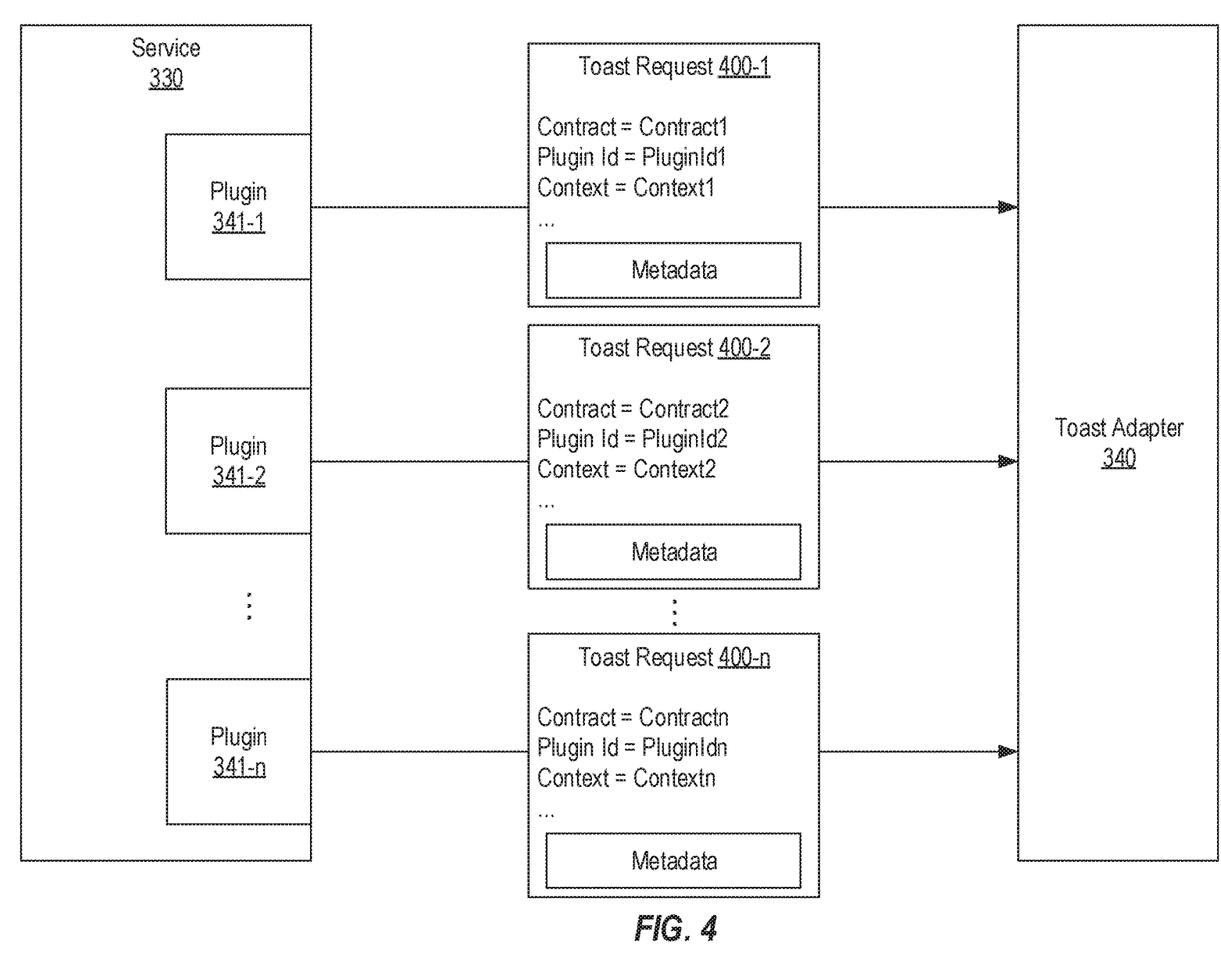
FIG. 4 provides an example of how the plugins can submit toast requests to the toast adapter for generating toast notifications.

FIG. 4 provides a more detailed example of how plugins 341-1 through 341-*n* may send toast requests to toast adapter 340 in some embodiments of the present invention. A toast request may include "plugin information" (e.g., information that toast adapter 340 may use to identify the particular plugin and to notify the particular plugin when the user interacts with one of its toast notifications) and toast metadata or "metadata" to be used in the toast content that toast adapter 340 will create.

In the depicted example, it is assumed that the plugin information includes a contract, a plugin Id and a context. However, this plugin information is merely one example of possibly many different types or combinations of plugin information that may be provided in a toast request. In this case, the contract identifies the type of toast notification that should be generated. For example, plugin 341-1 is shown as sending toast request 400-1 having a contract of "Contract1." As described more fully below, toast adapter 340 can employ the contract to determine how the metadata included in a toast request should be processed. Each toast request may also provide a plugin identifier that uniquely identifies the plugin and context that toast adapter 340 may employ when notifying the plugin of a user's interaction with the toast notification. The metadata included in a toast request can represent any information that toast adapter 340 may require or may be able to use in creating toast content.

As one example, plugin 341-1 could represent a plugin that is configured to generate a toast notification when computing device 300's battery has fallen below some threshold. In such cases, if service 330 is intended to provide such toast notifications, plugin 341-1 could be integrated into service 330 (and any other service that may provide such toast notifications). This integration could entail configuring service 330 (e.g., service's detection logic 330*a*) to invoke plugin 341-1 when it detects a low battery event. In response, plugin 341-1 may generate toast request 400-1 that specifies a contract of "Low Battery Toast Notification" and includes any metadata that may be required or desired (e.g., the current battery percentage or any other information that may not be the same in each such low battery toast notification). Upon receiving toast request 400-1, toast adapter 340 can access the contract to determine what type of toast notification is being requested and can then create toast content accordingly (e.g., by creating the toast content from a contract template that is customized in accordance with the metadata).

As another example, plugin 341-2 could represent a plugin that is configured to generate a toast notification when a firmware update is available on computing device 300. In such cases, if service 330 is intended to provide such toast notifications, plugin 341-2 could be integrated into service 330 to enable service 330 to invoke it whenever the availability of a firmware update is detected. In response, plugin 341-2 could generate toast request 400-2 that specifies a contract of "Firmware Update" and include in the metadata an identification of the firmware update, a criticality or the update or any other update specific information that should be included in the toast notification. Upon receiving toast request 400-2, toast adapter 340 can access the contract to determine what type of toast request is being requested and can then create the toast content accordingly.

These are merely simplified examples. In embodiments of the present invention, toast adapter 340 may enable a plugin to provide a wide variety of metadata to customize the toast content of any particular toast notification. For example, toast adapter 340 could enable a plugin to specify metadata that includes an expiry, header, scenario, action type, display duration or other configurable setting of the toast notification as well as metadata that defines the visual or audible content of the toast notification such as an image to be displayed, whether to include any dropdowns, textboxes, buttons, context menus, etc. In short, the metadata could include any of the actual values that may be included in the toast content itself (or information for deriving such values) but need not be formatted or structured as toast content. As suggested above, one benefit of employing a contract is to enable toast adapter 340 to utilize templates for creating the toast content. In other words, by specifying a contract, the plugin need not identify any metadata that will be the same across all toast notifications of the same type. However, in some embodiments, toast adapter 340 may not employ templates and may require the plugins to include in the metadata any content that is to be populated into the toast content. In any case, embodiments of the present invention should not be limited by the amount or type of metadata that may be included in the toast requests.

Figure 5:
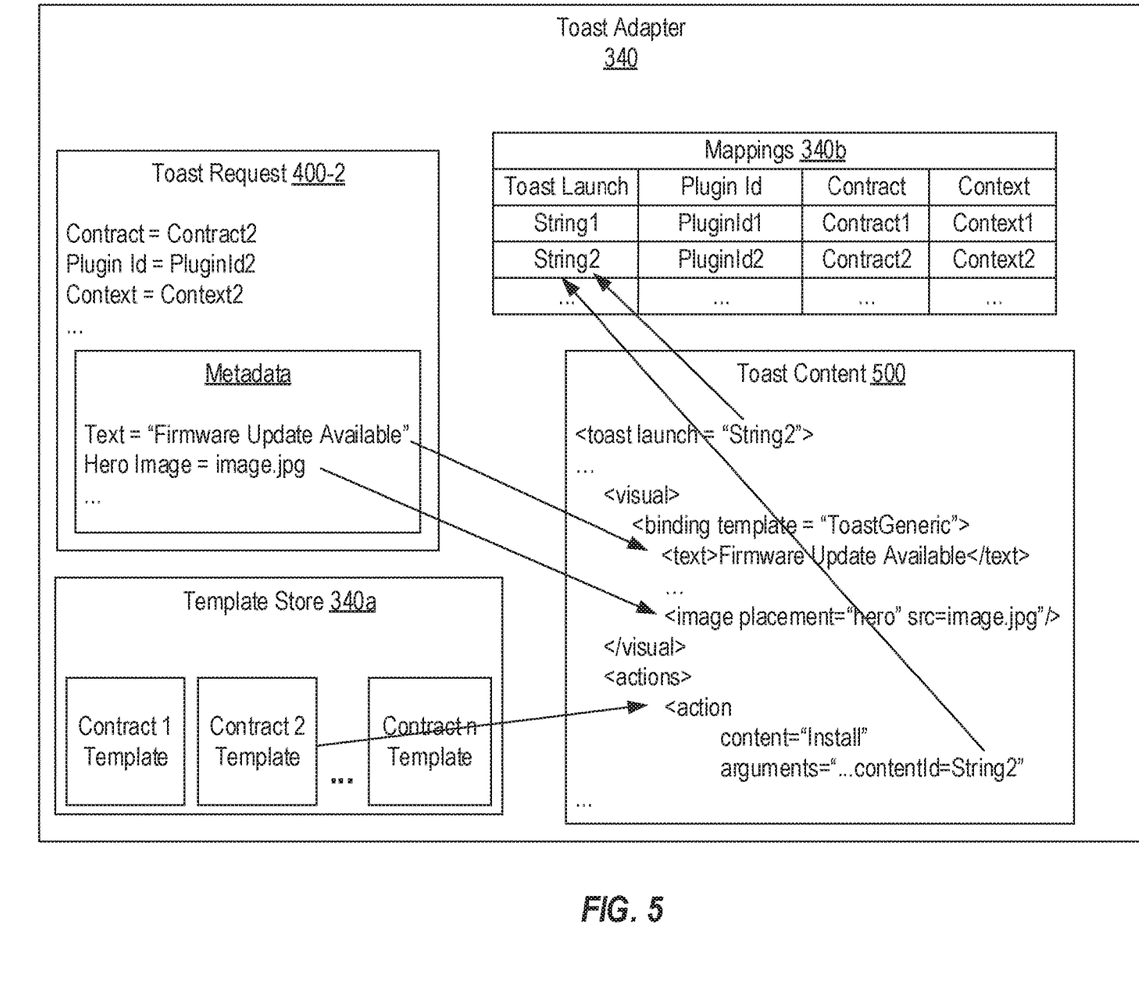
FIG. 5 provides an example of how the toast adapter can generate toast content in response to receiving a toast request from a plugin.

FIG. 5 provides an example of how toast adapter 340 may create toast content when it receives a toast request. In the depicted example, it is assumed that toast adapter 340 maintains a template store 340*a* in which toast adapter 340 maintains various contract templates. Toast adapter 340 may employ contract templates to minimize the amount of metadata that the plugins need to provide in the toast requests. However, as stated above, the use of contract templates is an optional feature of embodiments of the present invention. In particular, in some embodiments, the plugins may be configured to provide all the content for creating toast content even if such content may remain the same across toast notifications that the plugins may generate.

FIG. 5 shows that toast adapter 340 may create toast content 500 using the contract 2 template and the metadata specified in toast request 400-2. For example, toast content 500 can include a text element and an image element that are populated using the metadata and a default action element (e.g., a button) that is populated from the contract 2 template. Notably, toast content 500 may comply with the XML schema that the Windows toast framework 120 requires so that application 310 may simply submit toast content 500 to the Windows toast framework 120. However, in some embodiments, toast adapter 340 may configure toast content 500 in an intermediary format that application 310 refines prior to submitting it to Windows toast framework 120.

FIG. 5 also shows that toast adapter 340 may maintain mappings 340*b* which can represent any data structure that toast adapter 340 maintains to enable it to identify the appropriate plugin when the user interacts with a toast notification. For example, as part of creating toast content, toast adapter 340 can set the launch attribute to a unique string that can be used to identify the plugin that sent the toast request for which the toast content is being created. Similarly, toast adapter 340 may set an identifier within an action to a unique string or value that can also be used to identify the plugin. In some embodiments, the plugin may provide the unique string or identifier that toast adapter 340 should use for this purpose, while in other embodiments, toast adapter 340 may generate the unique string or identifier. Mappings 340*b* may also enable toast adapter 340 to provide proper context to the plugin to allow the plugin to respond appropriately to the user's interaction with the toast notification.

FIG. 5 provides an example in which toast adapter 340 has set the launch attribute in toast content 500 to "String2," the contentId for the action to "String2" and has added an entry in mappings 340*b* that associates String2 with PluginId2, the plugin Id of plugin 341-2. For ease of illustration, the same identifier is used for the launch and contentId but this need not be the case. The entry may also associate String2 with the contract of plugin 341-2 which may facilitate toast adapter 340's handling of the arguments it receives when the user interacts with a toast notification as described further below. The entry may also associate String 2 with the context, Context2, that plugin 341-2 specified in toast request 400-2. As stated above, mappings 340*b* are intended to represent any data structure(s) that toast adapter 340 may maintain, and therefore, the depicted entry should not be considered as limiting.

Figure 6:
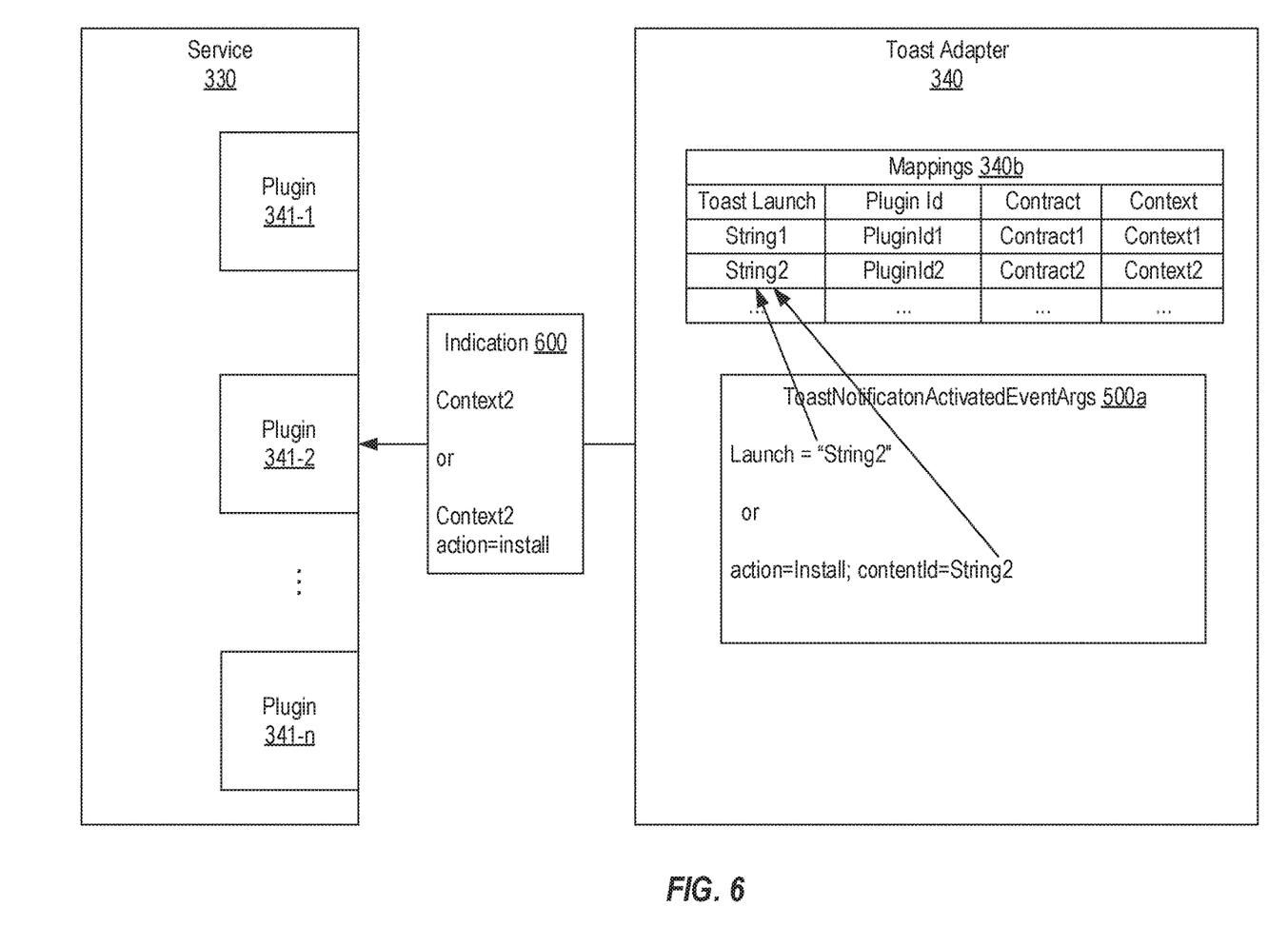
FIG. 6 provides an example of how the toast adapter can provide an indication of the user's interaction with a toast notification to the plugin that caused the toast notification to be displayed.

With reference to FIGS. 3B and 6, if the user interacts with the toast notification that the Windows toast framework 120 displays when it receives toast content 500, the Windows toast framework 120 will provide arguments containing the launch string (if the user merely selects the toast notification) or the contentId (if the user invokes a specific action provided in the toast notification) to application 310, which in this example is assumed to be String2 in either case. Application 310 can then relay the arguments to toast adapter 340 (possibly after performing some processing on the arguments). Toast adapter 340 may then identify that the arguments include String2 and use mappings 340*b* to determine that the toast notification with which the user interacted was generated by the plugin having a plugin Id of PluginId2 (Plugin 341-2). Toast adapter 340 can then send an indication 600 to plugin 341-2 that provides the proper context to enable plugin 341-2 (or service 330) to respond appropriately to the user's interaction with the toast notification.

For example, if ToastNotificationActivatedEventArgs 500*a* specifies only the launch value of String2, toast adapter 340 may use mappings 340*b* to retrieve Context2 and include it in indication 600. In contrast, if ToastNotificationActivatedEventArgs 500*a* specifies an action with the contentId of String2, toast adapter 340 may use mappings 340*b* to retrieve Context2 and include it along with the action information (e.g., an indication that the user selected the Install button) in indication 600. Upon receiving indication 600, plugin 341-2 can access the context, Context2, to determine how to respond. For example, if indication 600 only includes Context2 (indicating that the user only clicked on the toast notification but did not select any particular action (e.g., a button) within the toast notification, plugin 341-2 may cause service 330 to present a particular user interface matching Context2 (e.g., a user interface that displays information about the firmware on computing device 330 including the available update). On the other hand, if indication 600 includes Context2 and an indication that the user selected the Install button, plugin 341-2 may cause service 330 to commence the process of installing the firmware.

Figure 7:
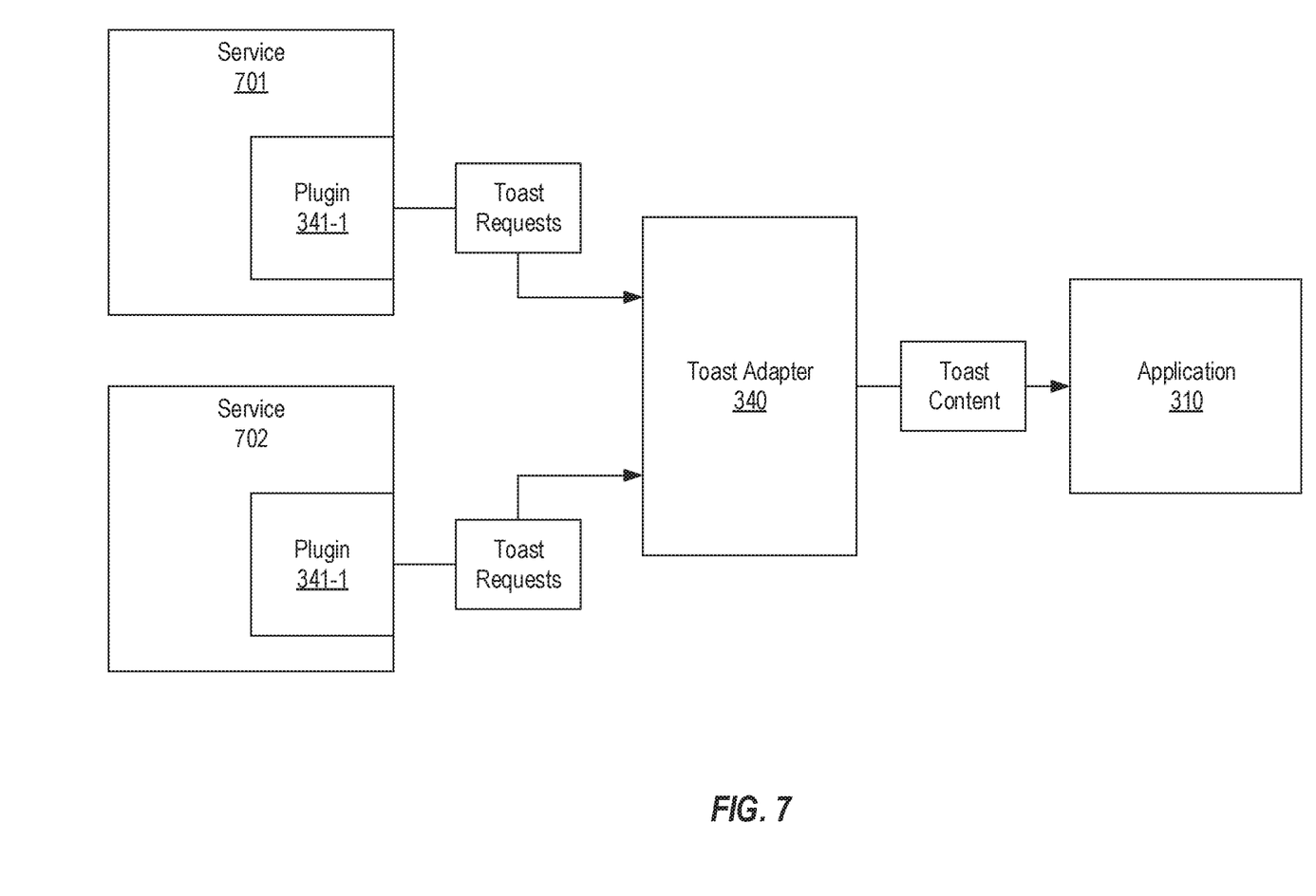
FIG. 7 provides an example where a plugin in used in multiple services to enable the services to provide toast notifications.

FIG. 7 provides an example of how plugin 341-1 can be integrated into multiple services 701 and 702 to enable the services to generate the same type of toast notifications. As shown, each instance of plugin 341-1 can send toast requests to toast adapter 340 in the manner described above to cause toast adapter 340 to generate and send toast content to application 310. The complexities of creating toast content and even toast requests are abstracted from services 701 and 702. In the event that it is desired to modify the type of toast notifications that plugin 341-1 provides, the modification can be made to plugin 341-1 and toast adapter 340 without needing to modify services 701 and 702 or application 310. In this way, embodiments of the present invention can simplify the process of developing and maintaining services that leverage the Windows toast framework.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing toast notifications via a toast adapter and plugins, the method comprising:
   receiving, at a toast adapter, a first toast request from a first plugin that is integrated into a first service;
   in response to the first toast request, generating, by the toast adapter, first toast content; and
   providing, by the toast adapter, the first toast content to an application to cause the application to submit the first toast content to the Windows toast framework to thereby cause a first toast notification to be displayed;
   in response to a user interacting with the first toast notification, receiving, by the toast adapter and from the Windows toast framework via the application, arguments representing how the user interacted with the first toast notification; and
   in response to receiving the arguments, sending, by the toast adapter and to the first plugin, an indication of the user's interaction with the first toast notification.

2. The method of claim 1, wherein the first toast request includes metadata, and wherein the toast adapter generates the first toast content from the metadata.

3. The method of claim 1, further comprising:
   in response to receiving the arguments, accessing, by the toast adapter, mappings to determine that the arguments pertain to the first plugin.

4. The method of claim 3, wherein determining that the arguments pertain to the first plugin comprises determining that the mappings associate an identifier that is included in the arguments with an identifier of the first plugin.

5. The method of claim 4, wherein the identifier that is included in the arguments comprises one of a launch string included in the first toast content or a content identifier of an action included in the first toast content.

6. The method of claim 1, wherein the first toast request specifies a first context, the method further comprising:
   including the first context in the indication of the user's interaction with the first toast notification.

7. The method of claim 1, wherein the toast adapter generates the first toast content using a contract associated with the first plugin.

8. The method of claim 1, further comprising:
   receiving, at the toast adapter, a second toast request from a second plugin that is integrated into the first service;
   in response to the second toast request, generating, by the toast adapter, second toast content; and
   providing, by the toast adapter, the second toast content to the application to cause the application to submit the second toast content to the Windows toast framework to thereby cause a second toast notification to be displayed.

9. The method of claim 1, further comprising:
   receiving, at the toast adapter, a second toast request from a second plugin that is integrated into a second service;
   in response to the second toast request, generating, by the toast adapter, second toast content; and
   providing, by the toast adapter, the second toast content to the application to cause the application to submit the second toast content to the Windows toast framework to thereby cause a second toast notification to be displayed.

10. The method of claim 9, wherein the first plugin and the second plugin are instances of the same plugin.

11. One or more computer storage media storing computer executable instructions which when executed on a computing device implement a method for managing toast notifications via a toast adapter and plugins, the method comprising:
    receiving, at a toast adapter, toast requests from one or more plugins that are integrated into one or more services;
    in response to each toast request, generating, by the toast adapter, toast content; and
    providing, by the toast adapter, the toast content generated for each toast request to an application to cause the application to submit the toast content generated for each toast request to the Windows toast framework to thereby cause a toast notification to be displayed in response to each toast request;
    in response to a user interacting with the toast notification that was displayed in response to a first toast request of the toast requests, receiving, by the toast adapter and from the Window s toast framework via the application, arguments representing how the user interacted with the toast notification;
    processing, by the toast adapter, the arguments to identify which of the one or more plugins sent the first toast request; and
    sending, by the toast adapter and to the identified plugin, an indication of the user's interaction with the toast notification.

12. The computer storage media of claim 11, wherein the one or more plugins comprise multiple plugins that are integrated into a service.

13. The computer storage media of claim 11, wherein the one or more plugins comprise multiple plugins that are integrated into multiple services.

14. The computer storage media of claim 11, wherein processing the arguments to identify which of the one or more plugins sent the first toast request comprises determining that an identifier that is included in the arguments is associated with an identifier of the identified plugin.

15. The computer storage media of claim 11, wherein the indication of the user's interaction with the toast notification includes context that the identified plugin included in the first toast request.

16. A computing device comprising:
one or more processors; and
computer storage media storing computer executable instructions which when executed by the one or more processors implement a method for managing toast notifications via a toast adapter and plugins, the method comprising:
in response to receiving toast requests from multiple plugins, generating, by a toast adapter, toast content for each of the toast requests;
causing, by the toast adapter, the toast content for each of the toast requests to be submitted to a toast framework to thereby cause a toast notification for each of the toast requests to be displayed including a first toast notification for a first toast request of the toast requests;
in response to a user interacting with the first toast notification that is displayed for the first toast request of the toast requests, receiving, by the toast adapter, arguments representing how the user interacted with the first toast notification;
in response to receiving the arguments, identifying, by the toast adapter, a first plugin of the multiple plugins that sent the first toast request; and
sending, by the toast adapter, an indication of the user's interaction with the first toast notification to the first plugin.

17. The computing device of claim 16, wherein the multiple plugins are integrated into a single service.

18. The computing device of claim 16, wherein the multiple plugins are integrated into multiple services.

* * * * *